3 Sheets. Sheet 1.
C. Wheeler. Jr.
Mower.
No. 1968 Reissued. May. 23. 1865.
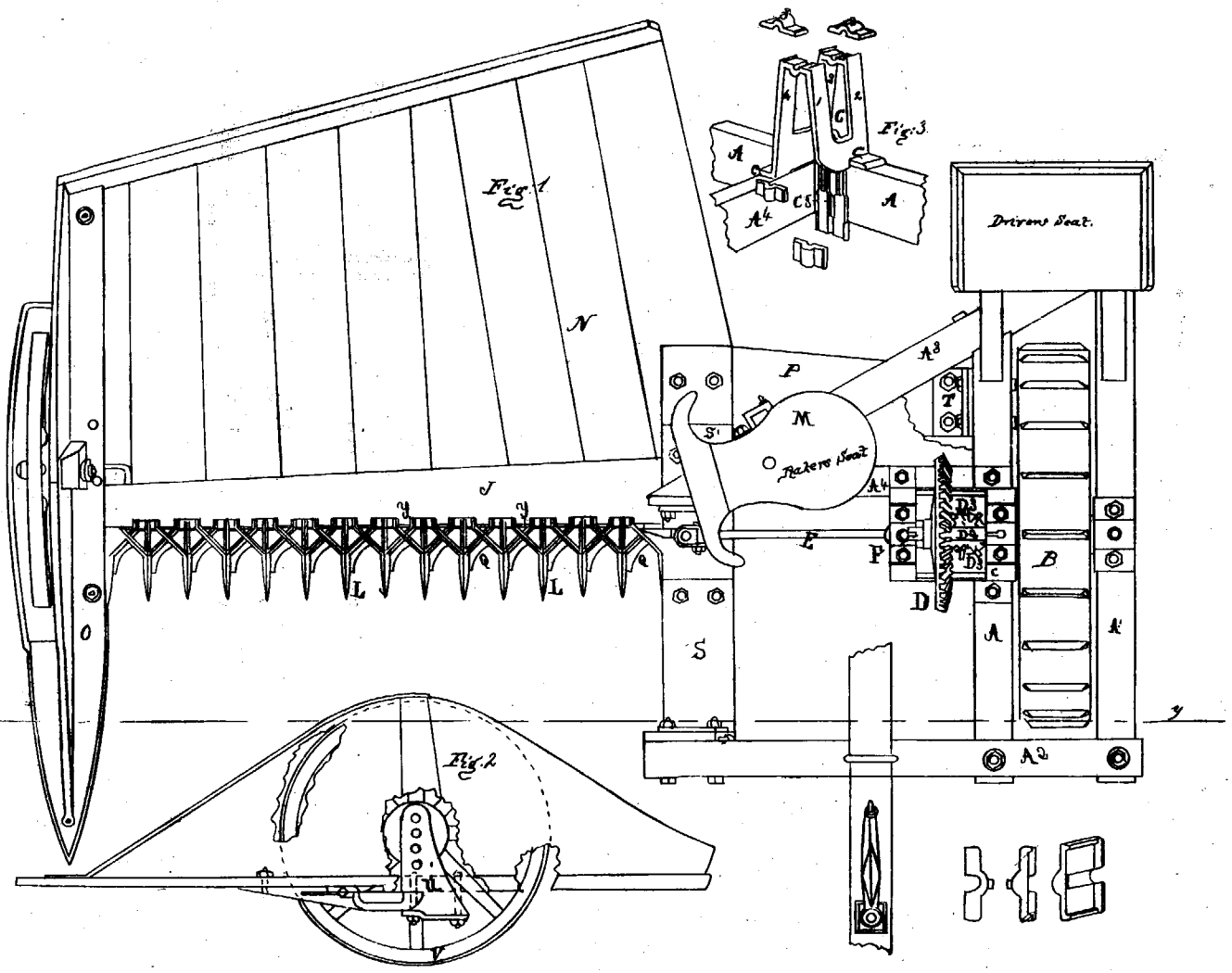
C. Wheeler Jr. By
E. B. Fortson Atty
Witnesses James H. Gridley
Allen T. Langston 3 Sheets. Sheet 2.
C. Wheeler, Jr.
Mower.
No. 1968 Reissued. May. 23. 1865.
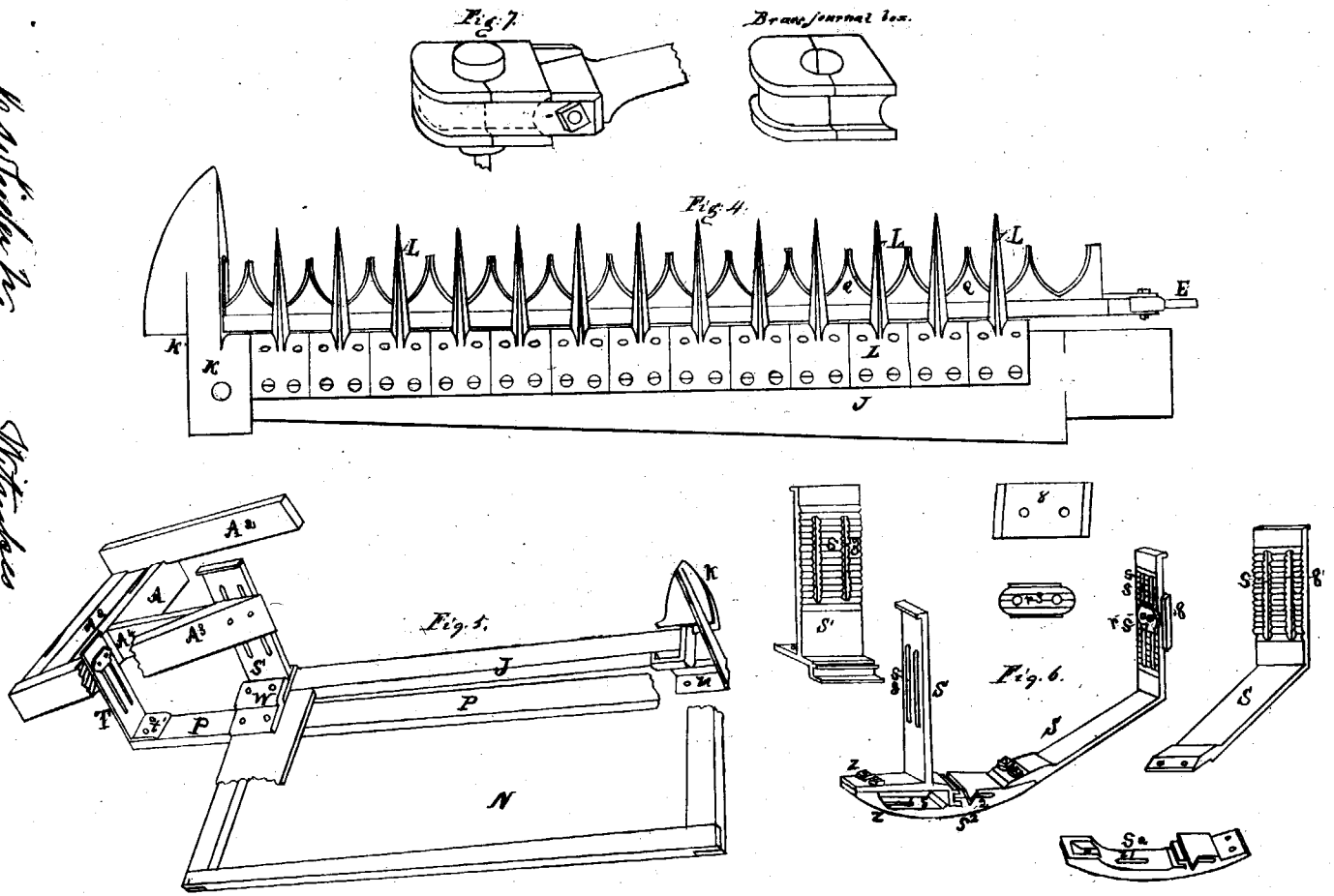
C. Wheeler Jr
By E. B. Forbush
Atty
Witnesses
James H. Spindle
Allen J. Gingetter 3 Sheets. Sheet 3.
C. Wheeler Jr.
Mower.
No. 1968. Reissued May. 23. 1865.
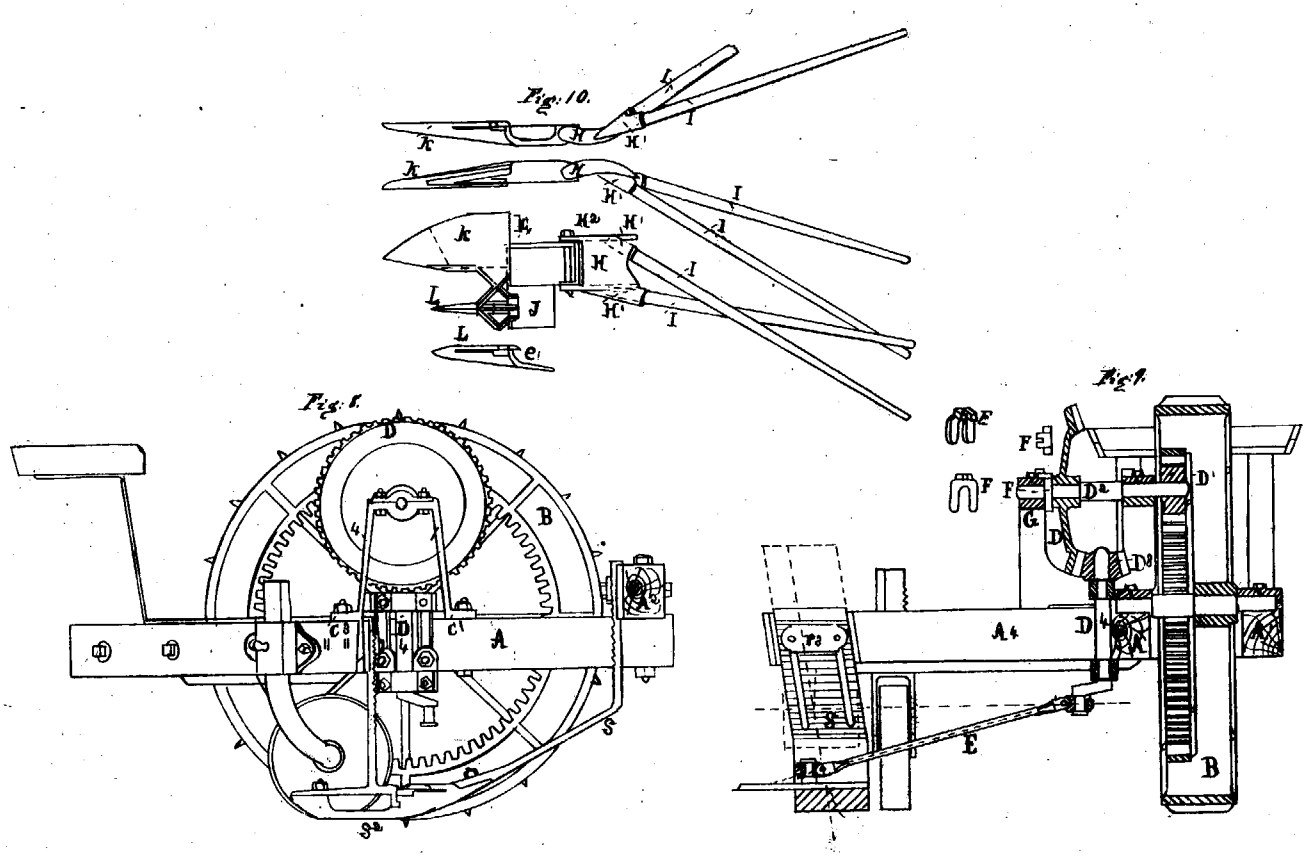
Witnesses
James H. Gridley
Allen F. Jonghton
C. Wheeler Jr.
By C. A. Forbush
Atty

UNITED STATES PATENT OFFICE.

CYRENUS WHEELER, JR., OF POPLAR RIDGE, NEW YORK, ASSIGNEE, BY MESNE ASSIGNMENTS, OF E. B. FORBUSH, OF BUFFALO, NEW YORK.

IMPROVEMENT IN HARVESTERS.

Specification forming part of Letters Patent No. 12,721, dated April 17, 1855; Reissue No. 707, dated April 26, 1859; Reissue No. 1,968, dated May 23, 1865.

DIVISION B.

*To all whom it may concern:*

Be it known that ELIAKIM B. FORBUSH, of the city of Buffalo, in the county of Erie and State of New York, heretofore invented certain new and useful Improvements in Grain and Grass Harvesting Machines, for which Letters Patent of the United States were issued to him on the 17th day of April, 1855, which said Letters Patent were afterward canceled and new Letters Patent issued to him on the 26th day of April, 1859, and such last-mentioned Letters Patent are deemed to be invalid and inoperative by reason of a defective and insufficient specification. Now, therefore, I, CYRENUS WHEELER, Jr., of Poplar Ridge, in the county of Cayuga and State of New York, assignee, by mesne assingments, of the whole interest of the said patent and said invention and improvements, do hereby declare, pursuant to the statute in such case made and provided, that the following is a full and exact description of a distinct and integral part of said invention, reference being had to the accompanying drawings, making a part of this specification, in which—

Figure 10 represents three views of a device called a "track-clearer," which is for the purpose of separating and moving the cut grass from that which is left standing sufficient to make a track for the inner shoe (which carries the inner end of the cutting apparatus) to travel in in each succeeding swath, so that the cutters will not be obstructed with the mowed grass. It also makes a track for the off horse to travel in in each succeeding swath. This track-clearer or tracker consists of a cast-iron piece, H, having sockets H′ formed therein for receiving and holding the ends of wooden fingers I in such manner that said fingers may project at different angles and spread apart so as to form a skeleton wedge, which will pass under and divide and turn inwardly from the outer end of the finger-bar that portion of the mowed grass which comes in contact therewith sufficiently to make a clear track for the inside shoe. The metallic part of this tracker or track-clearer is so formed that it may be connected to the outer shoe at the outer end of the finger-bar by means of a joint or hinge-bolt, as shown at $H^2$, so that it will slide on the ground like a runner and conform to the uneven surface, while the fingers project at different angles, so as to move the grass inwardly and sweep a clear track for the inside shoe and off-horse to travel in at each succeeding swath.

In constructing the metallic part of this device two or more sockets may be formed therein for holding the fingers, and these sockets may be so formed as to give any required angle and divergence to the fingers. They are made slightly tapering, so that the fingers may be driven in tight.

The finger-bar is represented at J, and the outer shoe or divider at K, and the guard-finger at L.

As the machine is drawn forward by the team the cut grass at the outer end of the finger-bar falls back upon the shoe and tracker, so that the tracker passes under the grass in such manner that the grass will be turned or moved inwardly by the fingers and accomplish the object desired.

Having now fully described this part of said invention so that persons skilled in the art to which it belongs may construct the same, what I claim as the invention of the said FORBUSH and desire to secure by these Letters Patent, is—

A hinged supporting-piece, H, having sockets H′ formed therein for holding divergent fingers, thereby forming a skeleton track-clearer, substantially as described.

In testimony whereof I hereunto subscribe my name in presence of two witnesses.

C. WHEELER, JR.

Witnesses:
W. H. MEAKER,
WM. ALLEN.